United States Patent [19]

Pedler

[11] 4,118,261
[45] Oct. 3, 1978

[54] METHOD FOR REINFORCING SHEET MATERIAL

[76] Inventor: Keith Pedler, 172 Bettington Rd., Carlingford, New South Wales, Australia

[21] Appl. No.: 754,674

[22] Filed: Dec. 27, 1976

[30] Foreign Application Priority Data

Jan. 6, 1976 [AU] Australia ............................. PC4458

[51] Int. Cl.² ........................... B32B 3/10; B32B 1/00
[52] U.S. Cl. ..................................... 156/145; 156/60; 264/94; 264/261; 427/276; 428/35; 428/178; 428/137; 428/195; 428/515
[58] Field of Search ................. 428/36, 178, 137, 195, 428/35, 515; 264/261, 94; 156/145, 147, 272, 293; 4/172.19; 5/365, 368, 369; 427/276

[56] References Cited

U.S. PATENT DOCUMENTS

| 3,011,930 | 12/1961 | Dworak | 156/145 |
| 3,859,674 | 1/1975 | Thomson | 4/172.19 |

*Primary Examiner*—George F. Lesmes
*Assistant Examiner*—P. J. Thibodeau
*Attorney, Agent, or Firm*—Young & Thompson

[57] ABSTRACT

A method of reinforcing fiberglass sheet material in which an inflatable envelope having a plurality of marginally sealed perforations therethrough is applied to the surface of the material. A wet layer of settable reinforcing material is then applied over the envelope and onto that part of the sheet material exposed by the perforations. The envelope is then inflated so as to cause the wet layer to assume a cratered form which is then allowed to solidify to form a reinforcing structure on the sheet material.

5 Claims, 3 Drawing Figures

METHOD FOR REINFORCING SHEET MATERIAL

The present invention relates to a method for reinforcing sheet material. The invention is particularly well adapted for use in reinforcing fibreglass sheet such as that used in the walls of pre-formed swimming pools, and will be described herein with reference to this particular use. However, it is not intended that the invention should be limited to the exemplary application described.

In the reinforcing of fibreglass sheet it has been well known to place a thin, pre-molded form of perforated plastics material against the dry fibreglass sheet such that inwardly flanged apertures or perforations in the form permit a subsequent layer of fibreglass to bond to the original sheet and form a composite reinforcing structure similar to that shown in FIG. 1 of the accompanying drawing.

This method of reinforcing the fibreglass sheet has a major deficiency in that it is difficult to ensure that the outer layer of fibreglass bonds effectively to the dry inner layer. Accordingly, after applying the outer layer it is necessary to force the wet fibreglass into the recesses individually so as to ensure adequate bonding.

It is an object of the present invention to provide a method of reinforcing sheet material which employs an inflatable envelope in place of the aforesaid pre-molded perforated form such that the mentioned deficiency may be ameliorated.

According to the invention there is provided a method of reinforcing fibreglass sheet material comprising the steps of:

placing against the surface of said sheet material an inflatable envelope defined by a bi-laminate sheet comprising two layers of pliant thermoplastic material, one overlaying the other and both provided with a plurality of mutually registering perforations, the marginal edge portions of said layers defining the perforations in a registering pair thereof being sealed together, substantially the entire outer periphery of each of said two layers being sealed to or integral with the adjacent outer periphery of the overlaying layer;

applying a wet layer of settable reinforcing fibreglass material over said envelope and onto that part of said sheet material which is exposed through said perforations;

inflating said envelope so as to cause said wet layer to assume a cratered form;

allowing said wet layer to solidify thereby to form a reinforcing structure on said sheet material.

A preferred embodiment of the invention will now be described by way of example only, with reference to the accompanying drawing in which.

Figure 1:
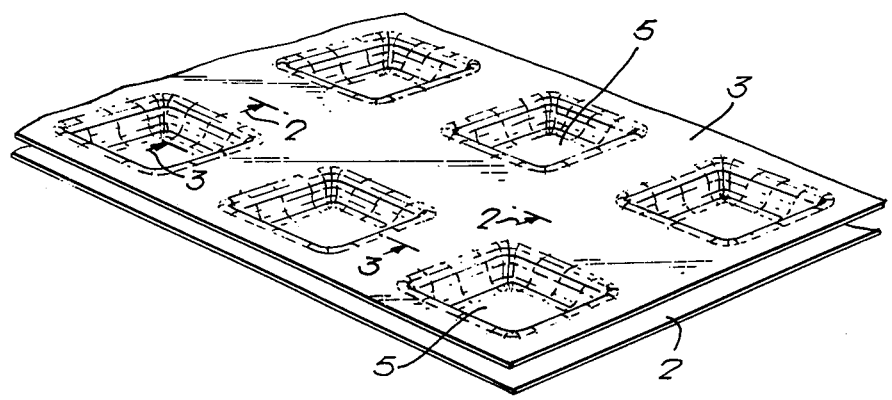
FIG. 1 shows a perspective view of a corner portion of reinforced fibreglass sheet produced by means of the present invention.
Figure 2:
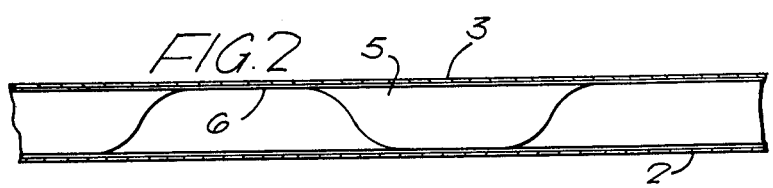
FIG. 2 is a sectional view taken on line 2—2 in FIG. 1.
Figure 3:
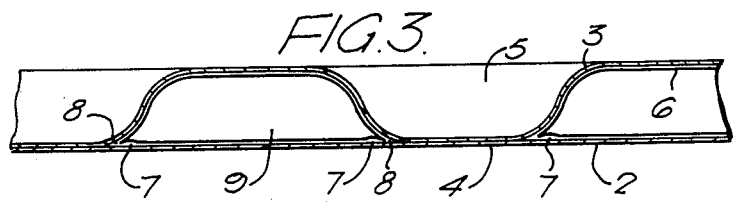
FIG. 3 is a sectional view taken on line 3—3 of FIG. 1.

Referring to the drawing, the finished reinforced sheet as illustrated is quite similar in overall appearance and characteristics to that produced by the previously described prior art method. The original fibreglass sheet 2 has been strengthened by the addition of an outer fibreglass layer 3 which is bonded to the inner sheet 2 at the bottom 4 of each of a plurality of craters 5.

When forming this structure by use of the method of the present invention, a bi-laminate sheet of thin plastics material as described above is sealed along opposite longitudinal edges to define a length of flattened sleeve 6 which is laid against the still wet outer surface of the fibreglass sheet 2 while it remains on the mold. The marginal edge portions 7 of the sleeve 6 around each perforation 8 are already sealed or pre-molded and when the transverse ends of the flattened sleeve are heat sealed, a closed envelope is formed having an inflatable body defined by the interstices between the plurality of perforations. The outer fibreglass layer 3 is then sprayed onto the outer surface of the flattened sleeve and makes immediate contact with the inner sheet 2 through the perforations since these perforations are not bordered by relatively deep flanges, as in the prior art, which would otherwise tend to restrict the contact of the outer layer with the surface of the inner sheet.

When the required area has been covered with the fibreglass coating, a hypodermic needle or similar device is inserted through the still wet outer layer and into the interior 9 of the sealed plastics envelope 6. Upon the injection of air through the hypodermic needle, the envelope 6 is caused to expand and adopt the configuration shown in the illustrations. It has been found that with an envelope formed of thin polythene, the wet outer layer 3 is sufficiently strong to retain its shape without the need to maintain pressure within the envelope 6. Alternatively, conduit means such as a tail or valve can be welded or otherwise permanently fixed to the sleeve to provide a means through which the envelope can be inflated.

From the foregoing it will be apparent that the final composite reinforced structure is similar to that previously known but it has been produced by a considerably more efficient method. The flattened plastics sleeve can, of course, be replaced by two overlaying sheets with initially unsealed edges. However, the entire outer periphery of these sheets would have to be sealed before use rather than simply the two transverse edges of the flattened sleeve described.

Although the invention has been described with reference to a specific example, it may be appreciated that the invention may be embodied in many other forms without departing from the scope of the inventive concept.

I claim:

1. A method of reinforcing fibreglass sheet material comprising the steps of:

placing against the surface of said sheet material an inflatable envelope defined by a bi-laminate sheet comprising two layers of pliant thermoplastic material, one overlaying the other and both provided with a plurality of mutually registering perforations, the marginal edge portions of said layers defining the perforations in a registering pair thereof being sealed together, substantially the entire outer periphery of each of said two layers being sealed to or integral with the adjacent outer periphery of the overlying layer;

applying a wet layer of settable reinforcing fibreglass material over said envelope and onto that part of said sheet material which is exposed through said perforations;

inflating said envelope so as to cause said wet layer to assume a cratered form;

allowing said wet layer to solidify thereby to form a reinforcing structure on said sheet material.

2. A method as defined in claim 1 wherein said thermoplastic material is polythene.

3. A method as defined in claim 1 wherein said perforations are substantially rectangular and arranged in a regular array of rows and columns.

4. A method as defined in claim 1, and fixedly attaching conduit means to at least one of said layers to provide a passage through which air can be supplied to the interior of said inflatable envelope.

5. A method as claimed in claim 1, and placing said envelope against said surface while said surface remains in a wet condition.

* * * * *